United States Patent
Takahashi et al.

(10) Patent No.: US 6,899,472 B2
(45) Date of Patent: May 31, 2005

(54) ELECTROMAGNETIC DRIVE

(75) Inventors: Keita Takahashi, Kanagawa (JP); Moriya Katagiri, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 158 days.

(21) Appl. No.: 10/037,375

(22) Filed: Jan. 4, 2002

(65) Prior Publication Data
US 2003/0059219 A1 Mar. 27, 2003

(30) Foreign Application Priority Data
Sep. 26, 2001 (JP) .......................... 2001-294421

(51) Int. Cl.⁷ ................................. G03B 9/08
(52) U.S. Cl. ................ 396/463; 396/467; 396/468; 396/493
(58) Field of Search ................. 396/449, 467, 396/451, 452, 463, 468, 470, 493, 495, 497, 500, 501, 246

(56) References Cited

U.S. PATENT DOCUMENTS

| | | | |
|---|---|---|---|
| 4,316,661 A | * | 2/1982 | Saito ............................ 396/467 |
| 4,505,568 A | * | 3/1985 | Asano et al. ................ 396/250 |
| 5,325,148 A | * | 6/1994 | Katagiri et al. ............. 396/246 |
| 5,548,367 A | * | 8/1996 | Katagiri ....................... 396/468 |
| 6,123,466 A | * | 9/2000 | Persson et al. ............. 396/358 |
| 6,572,283 B1 | * | 6/2003 | Imano ......................... 396/463 |

FOREIGN PATENT DOCUMENTS

JP 04-194912 7/1992

* cited by examiner

Primary Examiner—Judy Nguyen
Assistant Examiner—Rochelle Blackman
(74) Attorney, Agent, or Firm—Frishauf, Holtz, Goodman & Chick, P.C.

(57) ABSTRACT

An electromagnetic unit is provided for a lens barrel in which a light exposure controlling unit for controlling an amount of light is integrated. The electromagnetic unit is employed as a drive source for driving shutter blades, and a direction of the movement of a plunger in the electromagnetic unit is switched by a shutter lever, and the shutter blades are opened and closed. A coil and the plunger of the electromagnetic unit are disposed in parallel with an optical axis to reduce the space required for the electromagnetic unit, whereby downsizing of the light exposure controlling unit and the lens barrel is achieved.

29 Claims, 11 Drawing Sheets

ELECTROMAGNETIC DRIVE

This application claims the benefit of Japanese Application No. 2001-294421, filed in Japan on Sep. 26, 2001, the entire contents of which are incorporated herein by reference.

BACKGROUND OF THE INVENTION

1. Field of the Invention

The present invention relates to a construction of an electromagnetic drive for controlling the amount of light of a luminous flux.

2. Description of the Related Art

Hitherto, an electromagnetic unit, which is an electromagnetic drive, is employed in a light amount controlling unit such as a light exposure controlling unit for controlling the light exposure of a camera or the like as a driving source. For example, a light amount controlling unit for a conventional lens barrel shown in a cross section in FIG. 19 employs an electromagnetic unit shown in a cross section in FIG. 20 as a drive source.

The conventional lens barrel 110 includes a taking lens 112 held by a lens frame 111, and an opening 111a is provided on the lens frame 111 at the position behind the taking lens. Two shutter blades 113, 114 are rotatably supported by supporting pins 117b, 117a around the opening 111a. The shutter blades 113, 114 are rotated by the electromagnetic unit 100 via a drive pin 115a of a shutter lever 115 to open and close the opening 111a.

The electromagnet unit 100 is a plunger type electromagnet unit, and comprises a solenoid including a yoke 103, a ferromagnetic member 104, and a bobbin 102 supported by the yoke 103 and having a coil 101 wound thereon, and a plunger 105 being a movable iron core to be inserted into a hollow space portion of the bobbin 102, as shown in a cross sectional view of FIG. 20. The plunger 105 is urged by a coil spring 106 toward the direction of projection, and is sucked when the coil 101 is energized by a power source 107.

An end of the shutter lever 115 rotatably supported by the lens frame 111 abuts against the distal end of the plunger 105. When the coil is not energized, the plunger 105 is projected and the shutter blades 113, 114 are rotated to the close position by the shutter lever 115. When the coil is energized, the plunger 105 is sucked and thus the shutter lever 115 rotates clockwise by a torque of a torsion spring 116, and the shutter blades 113, 114 are rotated into the open position.

The light exposure controlling unit disclosed in Japanese Unexamined Patent Application Publication No. 4-194912 also employs a plunger-type electromagnetic drive having the same construction as the electromagnet unit 100 applied to the conventional light exposure controlling unit (light amount controlling unit) described above as a driving source.

In the light amount controlling unit of the conventional lens barrel 110 described above, when rotating the shutter lever 115 for driving the shutter blades as shown in FIG. 19, the shutter lever 115 is pressed by the head of the plunger 105 of the electromagnetic unit 100 in the direction of the axis of the plunger shaft. The electromagnetic unit 100 is disposed in such a manner that the plunger shaft lies perpendicularly to the optical axis O of the lens along the circumference of the lens frame.

Therefore, a large space, for example, a space of Do in diameter, is required for disposing the electromagnetic unit 100 in the lens frame 111, which results in increase in useless space, and stands in the way of downsizing the lens barrel.

The disposition of the electromagnetic unit with respect to the lens frame in the light exposure controlling unit disclosed in Japanese Unexamined Patent Application Publication No. 4-194912 is almost the same as that of the electromagnetic unit of the conventional light amount controlling unit shown in FIG. 19, and thus has the same disadvantage.

SUMMARY OF THE INVENTION

The present invention is intended to solve the disadvantage described above, and provides an electromagnetic drive which is integrated in an optical apparatus for controlling the amount light of a luminous flux and which is capable of efficient use of the space where it is placed.

One of the electromagnetic drives of the invention is a unit for controlling the amount of light of a luminous flux comprising a solenoid in which a winding axis of the coil lies in parallel with the direction of the luminous flux, a movable iron core to be moved by a magnetic force of the solenoid in the direction parallel with the direction of the luminous flux, and a blade member to be driven by the movable iron core for controlling the amount of light.

Another one of the electromagnetic drives of the invention is a unit for controlling the amount of light of a luminous flux comprising a plurality of solenoids in which the winding axes of the coils lie in the direction perpendicular to the direction of the luminous flux, a movable iron core to be moved by a magnetic force of the solenoid in the direction perpendicular to the direction of a luminous flux, and a blade member to be driven by the movable iron core for controlling the amount of light of a luminous flux.

Other characteristics and benefits of the invention will be apparent from the description described below.

DESCRIPTION OF THE PREFERRED EMBODIMENTS

Figure 1:
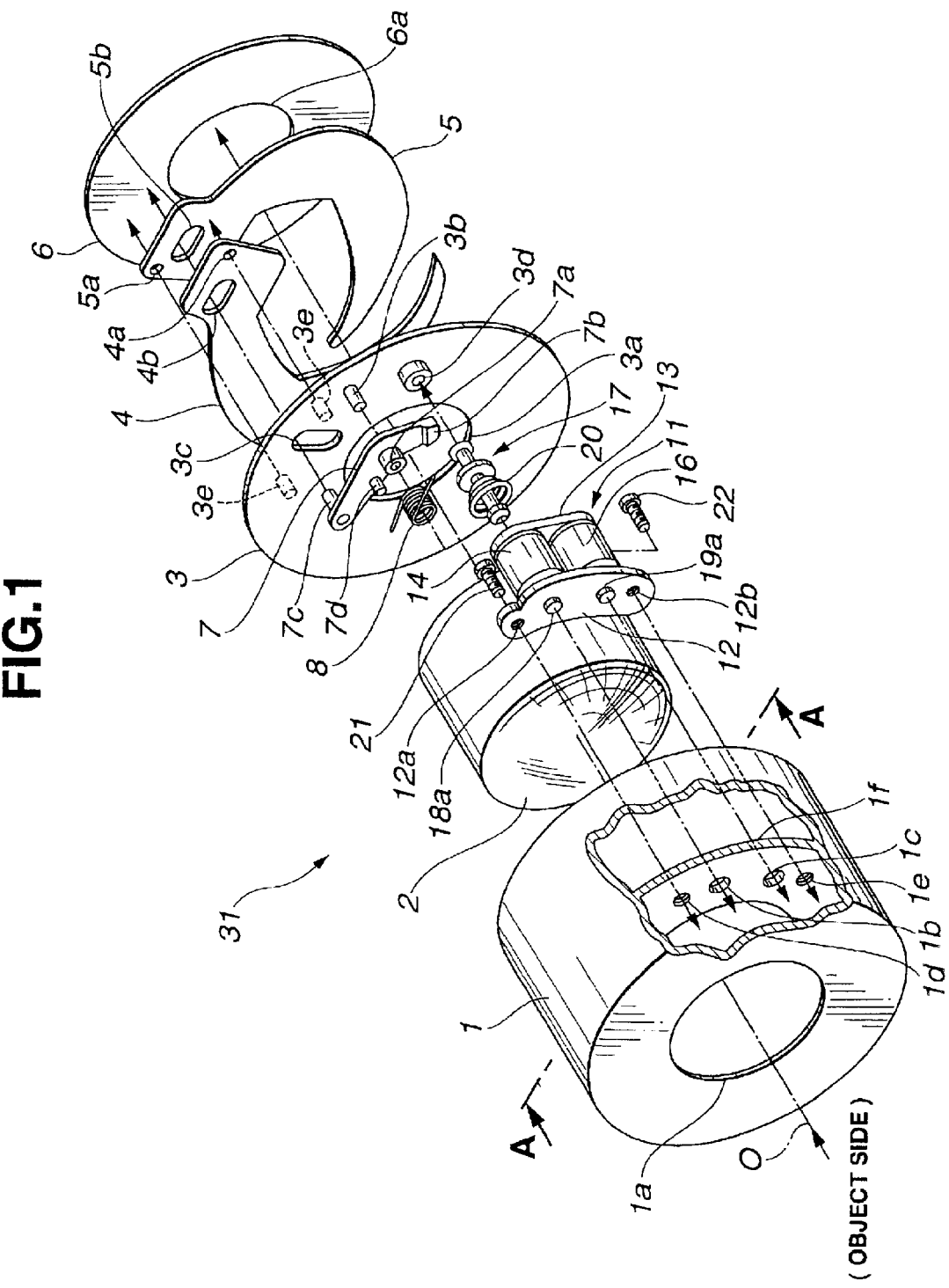
FIG. 1 is an exploded perspective view of a lens barrel having an electromagnetic unit according to the first embodiment of the invention integrated therein.

Referring now to the drawings, the embodiments of the invention will be described.

Figure 2:
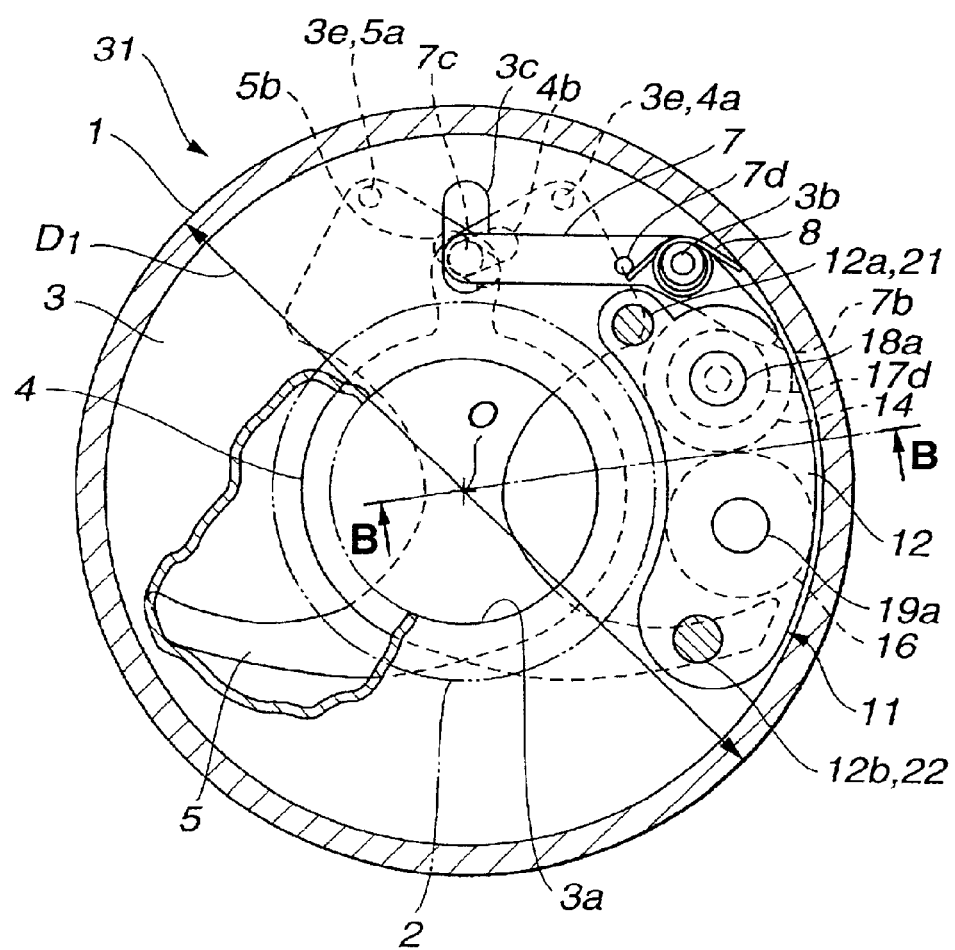
FIG. 2 is a cross sectional view of the lens barrel shown in FIG. 1 taken along the line A—A, showing a state in which the shutter blades are closed.
Figure 3:
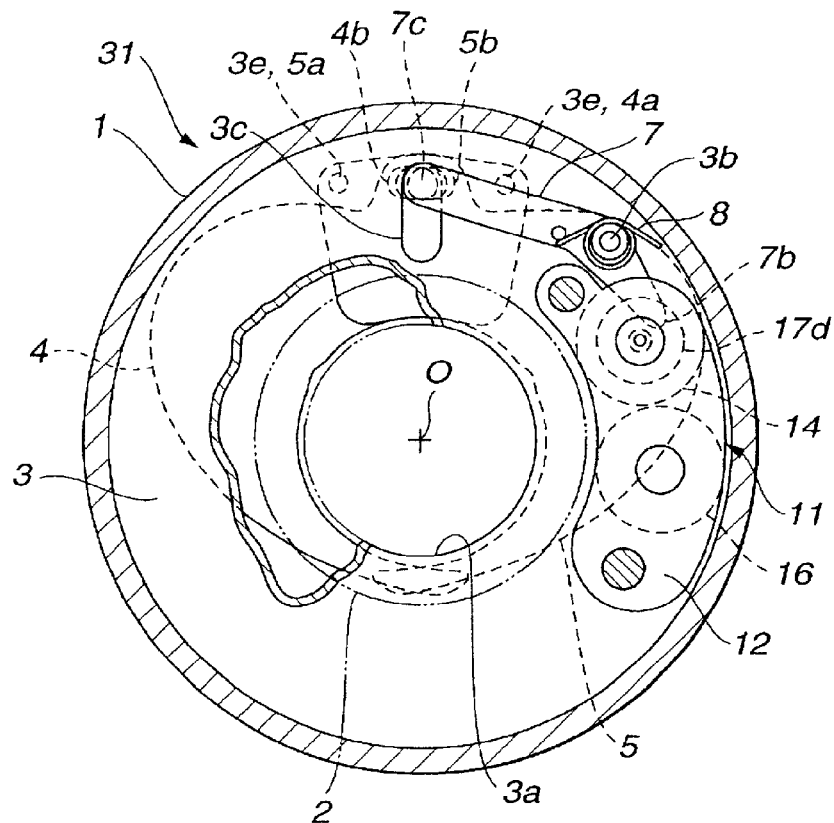
FIG. 3 is a cross sectional view of the lens barrel shown in FIG. 1 taken along the line A—A, showing a state in which the shutter blades are opened.
Figure 4:
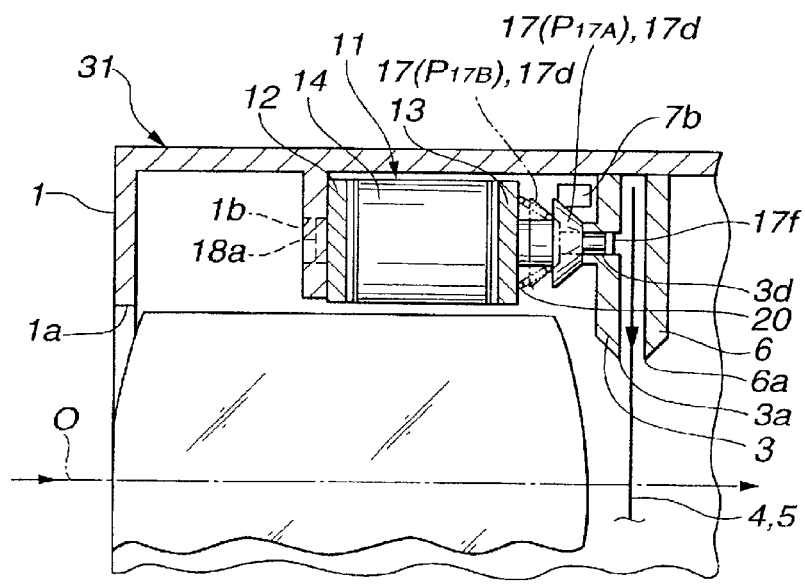
FIG. 4 is a cross sectional view of the lens barrel taken along the line B—B of FIG. 2.
Figure 5:
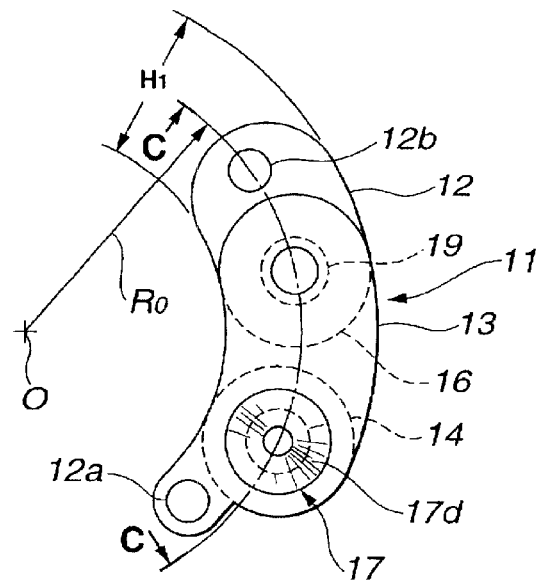
FIG. 5 shows an electromagnetic unit in the lens barrel shown in FIG. 1, viewed from the side of the surface from which the plunger projects.
Figure 6:
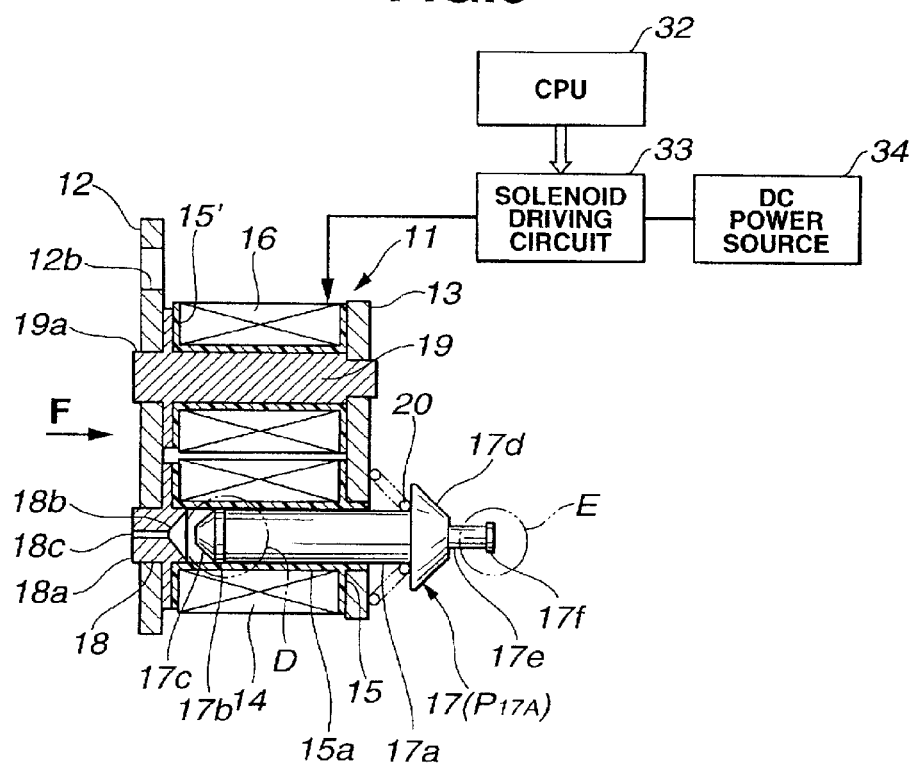
FIG. 6 is a cross sectional view of the electromagnetic unit shown in FIG. 5 taken along the line C—C, showing a state in which the plunger is projected.
Figure 7:
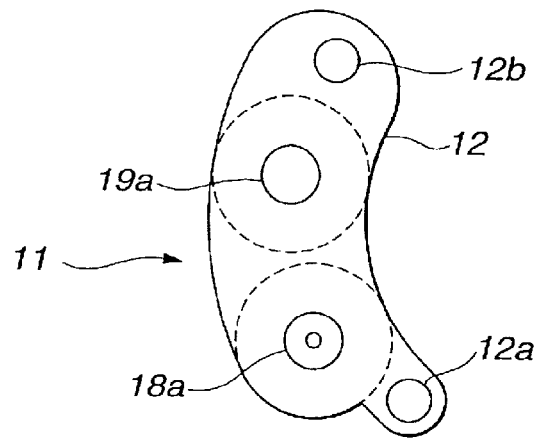
FIG. 7 is the electromagnetic unit shown in FIG. 6, viewed in the direction of the arrow F.
Figure 8:
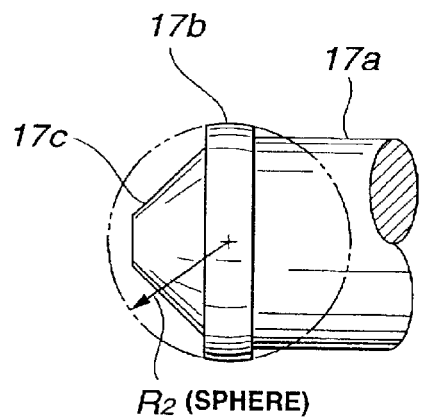
FIG. 8 is an enlarged view of the portion D in FIG. 6.
Figure 9:
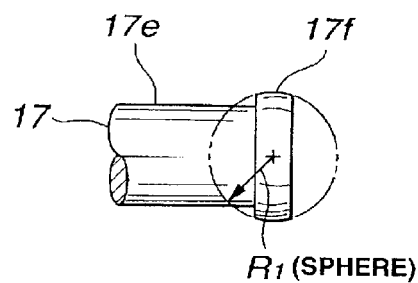
FIG. 9 is an enlarged view of the portion E in FIG. 6.

FIG. 1 is an exploded perspective view of a lens barrel having an electromagnetic unit according to one embodiment of the invention integrated therein. FIG. 2 and FIG. 3 are cross sectional views taken along the line A—A in FIG. 1. FIG. 2 shows a state in which the shutter blades are closed, and FIG. 3 shows a state in which the shutter blades are opened. FIG. 4 is a cross sectional view taken along the line B—B in FIG. 2, and FIG. 5 is a drawing of the electromagnetic unit viewed from the side of the surface from which the plunger is projected. FIG. 6 is a cross sectional view taken along the line C—C in FIG. 5, showing a state in which the plunger is projected. FIG. 7 is a drawing viewed in the direction of the arrow F in FIG. 6. FIG. 8 is an enlarged view of the portion D in FIG. 6. FIG. 9 is an enlarged view of the portion E in FIG. 6. In the description below, the direction of rotation is shown when viewed from the object side of the lens barrel.

The lens barrel 31 of this embodiment comprises, as shown in an exploded perspective view of FIG. 1, a lens frame 1, a taking lens 2 held by the lens frame 1 and having an optical axis O, and a light exposure controlling unit for controlling the amount of light of a luminous flux passing along the optical axis O.

The light exposure controlling unit comprises a shutter body 3 to be secured on the lens frame 1, two shutter blades 4, 5 rotatably supported by the shutter body 3 for controlling the amount of light, a shutter blade holding plate 6, a shutter blade opening/closing mechanism to be mounted on the shutter body 3, and a direct current electromagnetic unit 11, which is an electromagnetic drive.

The shutter body 3 is provided with an opening 3a for light exposure, a shutter lever supporting shaft 3b, a shutter drive pin insertion hole 3c, a bearing hole 3d for supporting the extremity of the plunger, and two supporting pins 3e for rotatably supporting the shutter blades.

The shutter blades 4, 5 are respectively provided with supporting holes 4a, 5a through which the supporting pin 3e of the shutter body is rotatably fitted, and driving holes 4b, 5b for driving the respective shutter blades. The shutter blades 4, 5 are rotated about the supporting pins 3c, 3e via the driving holes 4b, 5b, and are movable from the closed position shown in FIG. 2 to the opened position shown in FIG. 3.

The shutter blade opening/closing mechanism comprises an electromagnetic unit 11, a shutter lever 7 as a switching means for switching the direction in which a locomotive faculty of the plunger (iron core) 17 acts, which will be described later, and a shutter opening spring 8.

The shutter lever 7 comprises a shaft hole 7a, a plunger abutment portion 7b, a shutter driving pin 7c, and a spring hook 7d. The shaft hole 7a is rotatably fitted on the supporting shaft 3b on the shutter body 3, and the shutter driving pin 7c is fitted through the pin insertion hole 3c of the shutter body 3 and then fitted into the driving holes 4b, 5b of the shutter blades.

The electromagnetic unit 11 is an electromagnet of a plunger type, and comprises, as shown in the cross sectional view of FIG. 6, two plate-shaped yokes including a mounting yoke (first yoke member) 12 and a yoke on the side of the projecting end of the plunger (first yoke member) 13 formed of magnetic material, a fixed iron core (second yoke member) 19 formed of magnetic material and held between the yokes 12 and 13 to be inserted into the axial center of the coil (solenoid) 16 that will be described later, a fixed iron core 18 formed of magnetic material and serving as a plunger stopper to be fixed on the side of the yoke 12, a bobbin 15' to be fitted on the outer periphery of the fixed iron core 19 and held between the yokes 12 and 13, a bobbin 15 held between the yokes 12 and 13 and having a hollow space 15a, two coils (solenoids) 14, 16 connected in series with each other to be used as two solenoids aria wound on the bobbins 15 and 15' respectively in the opposite directions frozen each other, a plunger 17 formed of magnetic material and serving as an iron core of which the hollow space 15a is movable in the axial direction, and a conical spring 20 for urging the plunger 17 in the direction of projection.

The yokes 12, 13 are arced-shaped flat plate members placed in parallel with each other, each having a curvature radius of RO and a width of H1, and holding the coil 16 through which the fixed iron core 19 is inserted and a coil 14 having a hollow space 15a via the bobbins 15, 15' therebetween. In this state, the winding axes of the coils 14 and 16 are held in parallel with each other and orthogonal to the plane of the yokes 12, 13.

The plunger 17 has a band of projection that rises slightly in the radial direction at the end of the shaft portion 17a to be inserted into the hollow space 15a of the bobbin 15 as shown in an enlarged view in FIG. 8. The band of projection has a prescribed width and forms a spherical shaft portion 17b, which forms a part of the surface of a sphere the center point of which coincides with the axial center. The plunger 17 is also provided with a conical projection 17c that can be abutted against the support portion 18b of the fixed iron core 18 at the extremity thereof. On the other hand, the plunger 17 is provided with a conical surface portion (tapered portion) 17d having a larger diameter than the shaft portion to be inserted 17a and tapered from the outer diameter portion toward the direction of projection at the projecting end of the shaft portion thereof. In addition, the plunger 17 is provided with a small diameter portion 17e on the projecting side of the conical surface portion 17d, which has a band of projection that rises slightly in the radial direction at the extremity thereof as shown in the enlarged view in FIG. 9, and the band of projection has a prescribed width and forms a spherical shaft portion 17f, which forms a part of the surface of a sphere the center point of which coincides with the axial center.

The plunger 17 configured as described above lies orthogonal to a surface of the yoke 12, and inserted into the hollow space 15a of the bobbin 15 along the direction parallel with the fixed iron core 19 so as to be movable in the axial direction.

A conical spring 20 for urging the plunger 17 in the direction of projection is inserted between the outer diameter portion of the conical surface portion 17d and the yoke 13. The fixed iron core 18 is provided with a vent hole 18c for releasing air when the plunger 17 is sucked.

The electromagnetic unit 11 is mounted by securing the yoke 12 on the mounting wall If of the lens frame 1 which lies orthogonal to the optical axis O. In other words, screws 21, 22 are inserted into screw insertion holes 12a, 12b on the yoke 12 and screwed into the threaded portion 1d, 1e on the mounting wall If of the lens frame 1.

The tip 18a of the fixed iron core 18 and the tip 19a of the fixed iron core 19 are slightly projects outside the yoke 12, so that the tip portions are fitted into positioning holes 1b, 1c on the mounting wall If of the lens frame to accurately locate the electromagnetic unit 11 with respect to the lens frame 1 when being assembled. The spherical shaft portion 17f exposed outside the coil 14, which is the extremity of the plunger 17, is slidably fitted into a plunger guide shaft hole 3d that is a bearing portion of the shutter body 3 when being assembled.

In this state, the electromagnetic unit 11 is accommodated in the space between the inner peripheral surface of the lens frame 1 and the outer peripheral surface of the taking lens 2. The axes of plunger 17 and the fixed iron core 19, and the winding axes of the coils 14, 16 are located at the distance equal to the radius RO from the optical axis O as shown in FIG. 5, and the directions thereof are held in parallel with the direction of the optical axis O. Therefore, the plunger 17 moves in the direction parallel with the optical axis O when being sucked and projected.

The electromagnetic unit 11 is driven via a solenoid driving circuit 33 based on control signals for driving the solenoid supplied from a CPU 32 for controlling the camera shown in FIG. 6. In other words, in order to suck the plunger 17, a direct current exciting voltage of the DC power source 34 is applied to the coils 14, 16 via the solenoid driving circuit 33 to pass an exciting current. The exciting current supplied to the coils 14, 16 generates a magnetic flux on the coils, and thus a looped magnetic circuit is formed along the yoke 13, the plunger 17, the fixed iron core 18, the yoke 12, the fixed iron core 19, so that the plunger 17 is sucked. When the exciting current is shut down, the plunger is projected.

In the conventional electromagnetic unit, the magnetic circuit is formed by a magnetic flux generated at a single coil. However, in this electromagnetic unit 11, a magnetic circuit passing through the plunger 17 is formed by a magnetic flux generated at two coils connected in series 14, 16. The suction and projection of the plunger 17 is controlled by on/off of the magnetic circuit.

As shown in the cross section in FIG. 4, the plunger abutment portion 7b of the shutter lever 7 urged by a shutter spring 8 to rotate abuts against the conical surface portion 17d of the plunger 17 from the direction orthogonal to the plunger shaft for a sliding motion. Therefore, when the plunger 17 is projected or sucked, the direction in which a locomotive faculty of the plunger 17 acts is switched by the shutter lever 7, and the shutter lever 7 is rotated clockwise or counter-clockwise. The rotation of the shutter lever 7 rotates the shutter blades 4, 5 to the closed position or the opened position. The plunger 17 switches by the conical surface the locomotive faculty in the direction of the plunger axis to the locomotive faculty in the direction of a plane perpendicular to the luminous flux.

Since the plunger 17 is applied with a load of the shutter lever 7 on the conical surface portion 17d in the direction orthogonal to the plunger shaft, a lateral pressure is applied to the plunger 17. Therefore, when an electromagnetic unit having a construction in which the plunger is supported only by the hollow space of the bobbin is applied as in the case of the related art, the plunger is inclined in the cantilevered state and thus the smooth motion cannot be realized.

Therefore, according to the electromagnetic unit 11 applied in this embodiment, the plunger 17 is supported with the spherical shaft portion 17b at the end located in the hollow space of the bobbin and the spherical shaft portion 17f at the projected end fitted respectively in the hollow space 15a of the bobbin and the bearing hole 3d for supporting the extremity of the plunger, which prevents inclination of the plunger by the lateral pressure and increase in sliding resistance.

Furthermore, since the end of the plunger 17 located in the hollow space is the spherical shaft portion 17b, and the projecting end thereof is the spherical shaft portion 17f, even when the fitted plunger 17 is slightly inclined by the extent of looseness of the fit, or even when the center of the hollow space 15a of the bobbin and the center of the bearing hole 3d are not aligned by the lateral pressure, the plunger 17 can move smoothly.

The light exposure controlling action of the lens barrel 31 according to this embodiment constructed as described above will now be described.

In the state before starting light exposure, the exciting voltage applied by the electromagnetic unit 11 to the coils 14, 16 is in the off state, and the plunger 17 is released from the sucked state. In a state in which the plunger 17 is released from being sucked, the plunger abutment portion 7b of the shutter lever 7 abuts against the conical surface portion 17d of the plunger 17. The urging force of the conical spring 20 that urges the plunger 17 in the direction of projection exceeds a rotational urging force of the shutter lever 7 caused by the shutter spring 8. Therefore, the plunger 17 projects to the projected position P17A shown in the cross sectional view in FIG. 4. In this state, since the plunger abutment portion 7b of the shutter lever 7 is located near the outer diameter of the conical surface portion 17d of the plunger 17, and the shutter lever 7 rotates counterclockwise as shown in the cross sectional view in FIG. 2, the shutter blades 4, 5 are in the closed position.

In association with the start of light exposure, an exciting voltage of the electromagnetic unit 11 is applied via the solenoid driving circuit 33 to the coils 14, 16 by the control signals for driving solenoid supplied from the CPU 32, and thus the exciting current flows. The plunger 17 is sucked to the sucked position P17B shown in FIG. 4 by the exciting current. Since the conical surface portion 17d of the plunger 17 is retracted, the shutter lever 7 rotates clockwise by an urging force of the shutter spring 8 as shown in FIG. 3. The rotation or the shutter lever 7 rotates the shutter blades 4, 5 to the opened position via the shutter blade driving pin 7c and then light exposure starts.

After the lapse of light exposure time, application of the exciting voltage to the coils 14, 16 by the electromagnetic unit 11 via the solenoid driving circuit 33 is stopped by the control signals for releasing the solenoid supplied from the CPU 32, and thus the plunger 17 is released and projects to the projected position P17A shown in FIG. 4. Since the conical surface portion 17d of the plunger 17 moves in the direction of projection, the shutter lever 7 rotates counter-clockwise as shown in FIG. 2. The rotation of the shutter lever rotates the shutter blades 4, 5 to the closed position via the shutter blade driving pin 7c, and light exposure terminates.

In the lens barrel 31 of the first embodiment described thus far, the electromagnetic unit 11 for opening and closing the shutter blades 4, 5 is disposed so that the axis of the coil lies in parallel with the optical axis O, and thus the plunger 17 is disposed in parallel with the optical axis O as well. The shutter lever 7 switches the direction of movement of the plunger 17 to open and close the shutter blades 4, 5. Therefore, the arrangement of the shutter blades opening/closing mechanism including the electromagnetic unit 11 and the shutter lever 7 in this embodiment contributes to save the space required in the lens barrel 31 in the radial direction, and thus the outer diameter of the lens frame can be downsized. For example, the outer diameter D1 of the lens frame of the lens barrel 31 in this embodiment shown in FIG. 2 is smaller than the outer diameter D0 of the lens frame of the lens barrel 110 to which the conventional electromagnetic unit 100 shown in FIG. 20 is applied, and thus downsizing of the lens barrel is realized.

Figure 20:
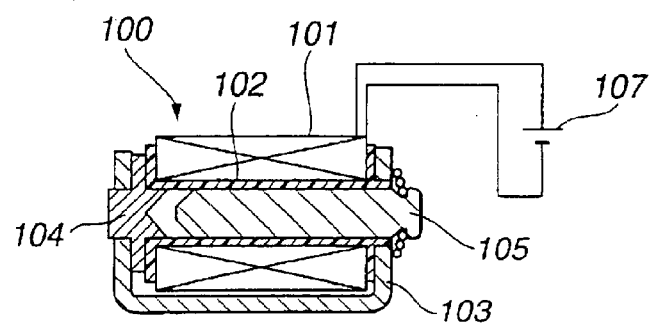
FIG. 20 is a vertical cross section of a conventional electromagnetic unit for driving the conventional light exposure controlling unit shown in FIG. 19.

Since the electromagnetic unit 11 comprises a solenoid formed of two coils 14, 16, the radial dimension and/or the axial dimension of the coil is smaller than that in the above-described conventional electromagnetic unit 100 shown in FIG. 20. From this point of view, the outer diameter or the length of the lens frame may be reduced.

Since the axis of coil of the electromagnetic unit 11 is disposed in parallel with the optical axis O, the plunger 17 is also disposed in parallel with the optical axis O. Therefore, the direction of movement of the plunger 17 and the direction of rotation of the shutter lever 7 are the same, and thus the lateral pressure is applied to the plunger 17 by a reaction force acting on the shatter lever 7.

Figure 11:
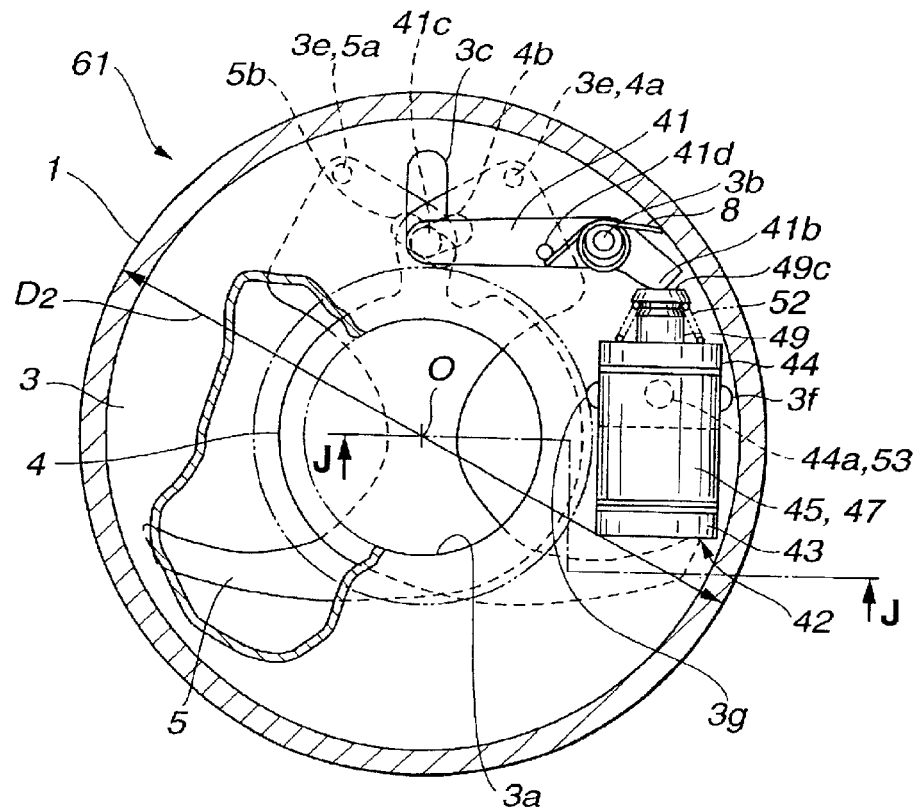
FIG. 11 is a cross sectional view of the lens barrel shown in FIG. 10 taken along the line G—G, showing a state in which the shutter blades are closed.

If the plunger employed is a cantilevered plunger 105 as in the conventional electromagnetic unit 100 shown in FIG. 11, when the lateral pressure is applied to the plunger 17, there may be a case where the plunger cannot be projected or sucked in a smooth motion. However, according to this embodiment, since the plunger 17 is supported both at the spherical shaft portion (a band of projection) 17b at the extremity located in the hollow space of the bobbin and at the spherical shaft portion (a band of projection) 17f at the extremity being projected, inclination of the plunger 17 is prevented and thus sliding resistance is prevented from increasing. Concurrently, since the extremities are formed with the spherical shaft portions 17b, 17f each having a spherical surface, the movement of the plunger 17 is prevented from being heavy even when the plunger 17 is inclined by the extent of looseness of the fit. Therefore, the smooth movement of the plunger 17 is ensured and thus the preferable light exposure controlling (the amount-of-light controlling) operation is realized.

Though the solenoid of the electromagnetic unit 11 applied to the lens barrel 31 of this embodiment is formed of two coils 14, 16, it is not limited thereto, and it is also possible to apply a single coil and employ the plunger 17 having band of projections as described above in the electromagnetic unit in which the axes of the coil and the plunger are disposed in parallel with the optical axis O to obtain the same effects.

The lens barrel in which the electromagnetic unit according to the second embodiment of the present invention is integrated will now be described.

Figure 10:
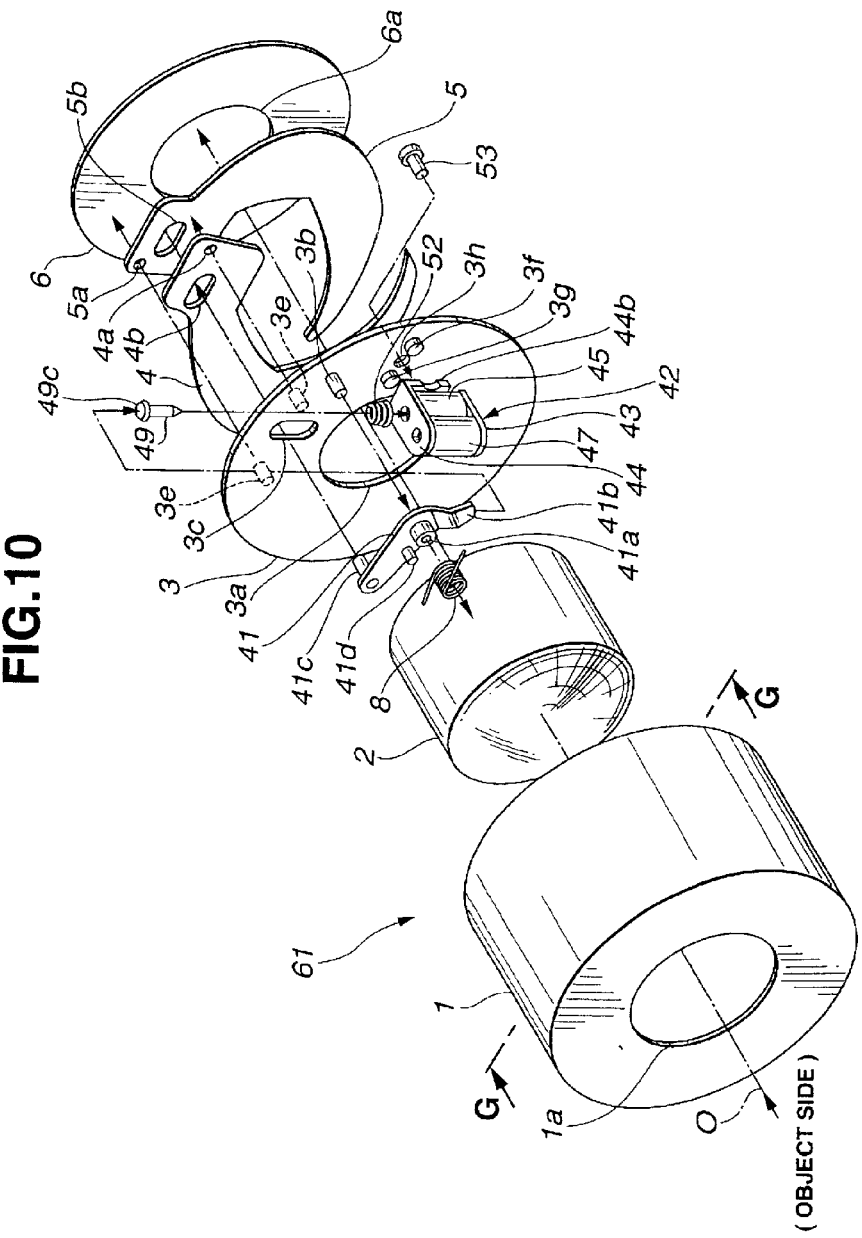
FIG. 10 is an exploded perspective view of the lens barrel in which an electromagnetic unit according to the second embodiment of the invention is integrated.
Figure 12:
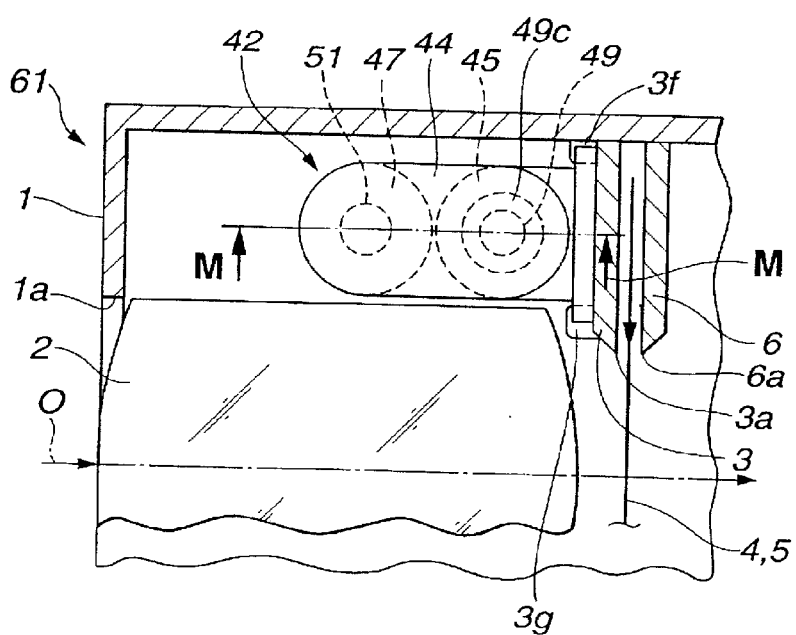
FIG. 12 is a cross sectional view of the lens barrel shown in FIG. 10 taken along the line J—J in FIG. 11.
Figure 13:
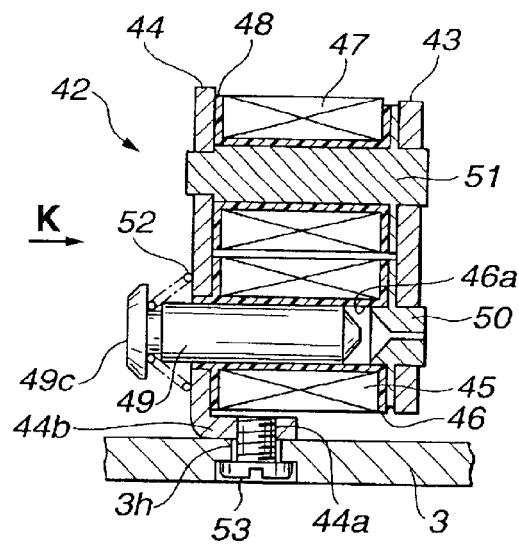
FIG. 13 is a cross sectional view of the lens barrel shown in FIG. 10 taken along the line M—M in FIG. 12, showing a vertical section along the optical axis of the electromagnetic unit.
Figure 14:
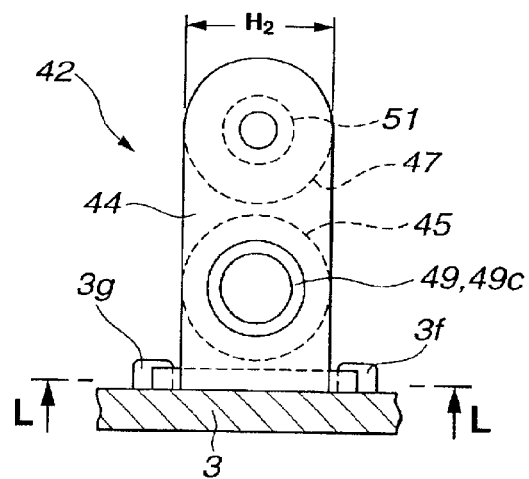
FIG. 14 shows the lens barrel shown in FIG. 10 viewed from the direction of the arrow K in FIG. 13.
Figure 15:
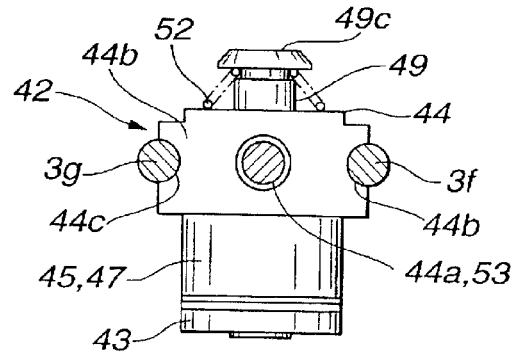
FIG. 15 is a cross sectional view of the lens barrel shown in FIG. 10 taken along the line L—L in FIG. 14.

FIG. 10 is an exploded perspective view of the lens barrel according to the second embodiment. FIG. 11 is a cross sectional view taken along the line G—G in FIG. 10, showing a state in which the shutter blades are in the closed state. FIG. 12 is a cross sectional view taken along the line J—J in FIG. 11. FIG. 13 is a cross sectional view taken along the line M—M in FIG. 12, showing a vertical section along the plane being parallel with the optical axis of the electromagnetic unit to be applied to the lens barrel. FIG. 14 is a drawing viewed in the direction of the arrow K in FIG. 13. FIG. 15 is a cross section taken along the line L—L in FIG. 14.

The lens barrel 61 of this embodiment comprises, as shown in the exploded perspective view in FIG. 10, a lens frame 1, a taking lens 2 held by the lens frame 1 and having an optical axis O, and a light exposure controlling unit for controlling the amount of light of the luminous flux passing through the optical axis O.

The light exposure controlling unit comprises a shutter body 3 to be secured to the lens frame 1, two shutter blades 4, 5 rotatably supported by the shutter body 3 for controlling the amount of light, a shutter blade holding plate 6, and a shutter blade opening/closing mechanism to be mounted to the shutter body 3, and an electromagnetic unit 42 as an electromagnetic drive.

The shutter body 3 is provided with an opening 3a for light exposure as in the case of the first embodiment, a shutter lever supporting shaft 3b, a shutter driving pin insertion hole 3c, two supporting pins 3e for rotatably supporting the shutter blade, a screw insertion hole 3h for mounting the electromagnetic unit, and positioning projections 3f, 3g for the electromagnetic unit.

The shutter blades 4, 5 have the same construction as those applied to the lens barrel 31 of the first embodiment.

The shutter blade opening/closing mechanism comprises a shutter lever 41 and the shutter opening spring 8.

The shutter lever 41 is also the same member as the shutter lever 7 applied to the lens barrel 31 in the first embodiment, and provided with a shaft hole 41a, a plunger abutment portion 41b, a shutter driving pin 41c, and a spring hook 41d. The shaft hole 41a is rotatably fitted on the supporting shaft 3b of the shutter body 3, and the shutter driving pin 41c is fitted through the pin insertion hole 3c of the shutter body 3 and then fitted into the driving holes 4b, 5b of the shutter blades.

The electromagnetic unit 42 is a direct current solenoid plunger, and comprises, as shown in a cross sectional view of FIG. 13, two plate-shaped yokes comprising a yoke (first yoke member) 43 and a yoke on the side of the projecting end of the plunger (first yoke member) 44 each formed of magnetic material, a fixed iron core 50 for a plunger stopper formed of magnetic material to be fixed on the side of the yoke 43, a fixed iron core (second yoke member) 51 formed of magnetic material to be secured between the yokes 43, 44, a bobbin 46 to be held between the yokes 43, 44 and having a hollow space 46a, a bobbin 48 held between the yokes 43, 44 to be fitted on the outer periphery of the fixed iron core 51, two coils 45, 47 connected in series with each other each serving as a solenoid to be used as two solenoids and wound on the bobbins 46, 48 in the opposite directions from each other, a plunger 49 formed of magnetic material and serves as a movable iron core, and a conical spring 52 for urging the plunger 49 in the direction of projection.

The yokes 43, 44, each being a plate member having a width of H2, are held and fixed in parallel at a prescribed distance with each other with the coil 47 through which the fixed iron core 51 is inserted and the coil 45 having the hollow space 46a interposed therebetween. In this state, the coil 45, 47 are held in a state in which the winding axes of the coils lie in parallel with each other and orthogonal to the planes of the yokes 43, 44. The end of the yoke 44 opposite from the fixed iron core 51 is bent in the direction orthogonal to the plane of the yoke 44, and the bent portion 44b is provided with a screw hole 44a and positioning recesses 44b, 44c.

The plunger 49 is movable in the hollow space 46a of the bobbin 46 along the direction orthogonal to the plane of the yoke 44 and parallel with the axis of the fixed iron core 51.

When mounting the electromagnetic unit 42 to the shutter body 3, the bent portion 44b of the yoke 44 is abutted against the surface of the shutter body 3 on the side of the taking lens, which is orthogonal to the optical axis O, and the positioning projections 3f, 3g are fitted into the positioning recesses 44b, 44c. Then, a screw 53 is inserted into a screw insertion hole 3h and then screwed into a threaded hole 44a on the yoke 44 to fixedly mount the yoke 44. In this state, the direction of the axis of the plunger 49, and the directions of the winding axes of the coils 45, 47 respectively lie along the circumference of the optical axis O, in other words, along the direction perpendicular to the optical axis O. More specifically, the respective winding axes of the coils 45, 47 are disposed along a plane perpendicular to the direction of the optical axis O (luminous flux). Therefore, the plunger 49 moves in the direction perpendicular to the optical axis O when being sucked and projected.

The electromagnetic unit 42 is accommodated between the outer periphery of the taking lens 2 and the inner periphery of the lens frame 1 in a state in which the coils 45, 47 lie along the optical axis O as shown in FIG. 12.

In the electromagnetic unit 42, as in the case of the electromagnetic unit 11, a direct current exciting voltage is applied via the solenoid driving circuit to the coils 45, 47 based on the control signals for driving the solenoid supplied from the CPU for controlling the camera, and thus the exciting current flows. The exciting current supplied to the coils 45, 47 generates a magnetic flux on the coils 45, 47, and thus a looped magnetic circuit is formed along the yoke 44, the plunger 49, the fixed iron core 50, the yoke 43, and the fixed iron core 51. By turning on and off the magnetic circuit, suction and projection of the plunger 49 is controlled.

The shutter lever 41 is urged to rotate by the shutter spring 8, and the plunger abutment portion 41b of the shutter lever 41 abuts against the top surface 49c of the plunger 49 from the direction of the axis of the plunger. The projection and suction of the plunger 49 make the shutter lever 7 rotate to control the opening and closing of the shutter blades 4, 5.

The light exposure controlling operation of the lens barrel 61 of this embodiment having a construction described thus far will now be described.

In the state before starting light exposure, the exciting voltage of the electromagnetic unit 42 applied to the coils 45, 47 is in the off state, the plunger 49 is released, and the plunger abutment portion 7b of the shutter lever 7 is pressed by a urging force of the conical spring 52. Since the urging force of the conical spring 52 is larger than the urging force of the shutter spring 8, the shutter lever 7 rotates counterclockwise, and the shutter blades 4, 5 rotate to the closed position shown in FIG. 11.

When the control signals for driving the solenoid are supplied from the CPU in association with the start of light exposure, an exciting voltage is applied to the coils 45, 47 of the electromagnetic unit 42, and power distribution is started. The plunger 49 is sucked to the sucked position. In accordance with sucking operation of the plunger 49, the shutter lever 41 rotates clockwise from the state shown in FIG. 11 by an urging force of the shutter spring 8. The rotation of the shutter lever rotates the shutter blades 4, 5 to the opened position via the shutter blade driving pin 41c, and then light exposure starts.

After the lapse of light exposure time, power distribution to the coils 45, 47 of the electromagnetic unit 42 is stopped by the control signals for releasing the solenoid supplied from the CPU, and the plunger 49 is projected. The shutter lever 7 is pressed by the extremity 49c of the plunger 49 and rotates counterclockwise. The rotation of the shutter lever rotates the shutter blades 4, 5 to the closed position via the shutter blade driving pin 41c as shown in FIG. 11, and light exposure terminates.

According to the lens barrel 61 in the second embodiment of the invention described thus far, the solenoid is formed of two coils connected in series in the electromagnetic unit 42 as well as the electromagnetic unit 11 in the first embodiment, and thus the outer diameter of the coil is smaller than that of the single coil in the conventional electromagnetic unit 100 shown in FIG. 20. Therefore, the electromagnetic unit 42 may be accommodated in a smaller space between the outer periphery of the taking lens and the inner periphery of the lens frame, and thus the outer diameter of the lens frame may be reduced. For example, the outer diameter of D2 of the lens frame of the lens barrel 61 in this embodiment shown in FIG. 11 is smaller than the outer diameter D0 of the lens frame of the lens barrel 110 to which the conventional electromagnetic unit shown in FIG. 20 is applied, and thus downsizing of the lens barrel is realized.

In the lens barrel 61, since the electromagnetic unit 42 is accommodated between the outer periphery of the taking lens 2 and the inner periphery of the lens frame 1 with the axes of the coils 45, 46 lied in the direction perpendicular to the optical axis O and aligned along the optical axis O, the space required for the electromagnetic unit 42 is further reduced and thus the lens barrel can further be downsized.

Moreover, as an example of variation of the above electromagnetic unit 42 arranged perpendicularly to the optical axis O, it is possible to propose a structure in which a bearing portion is arranged on the outside of a solenoid (coils), just like as the structure of the electromagnetic unit 11 in the first embodiment, while forming at the distal end of the outside of the plunger a band of projection (spherical surface bearings) which are slidably fitted into the bearing portion. According to this variation of electromagnet, the same effect as in the electromagnet unit 11 is achieved and thus a smooth plunger movement can be obtained.

Figure 16A:
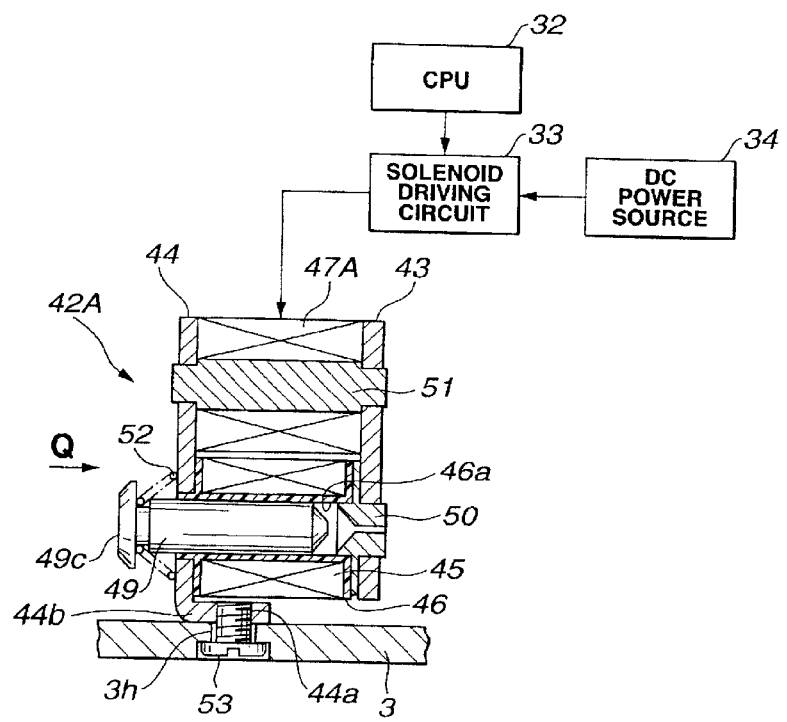
FIG. 16A is a vertical cross section taken along the optical axis of the electromagnetic unit according to the third embodiment of the invention.
Figure 16B:
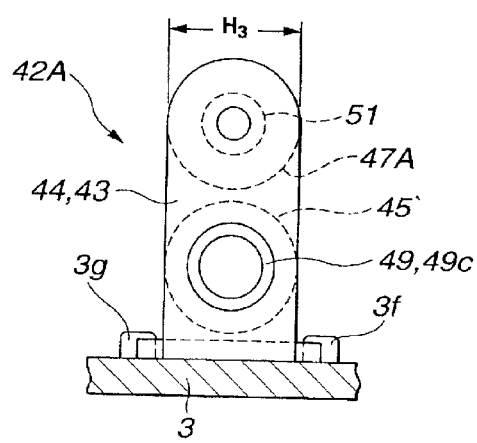
FIG. 16B is a drawing viewed in the direction of the arrow Q in FIG. 16A.
Figure 17:
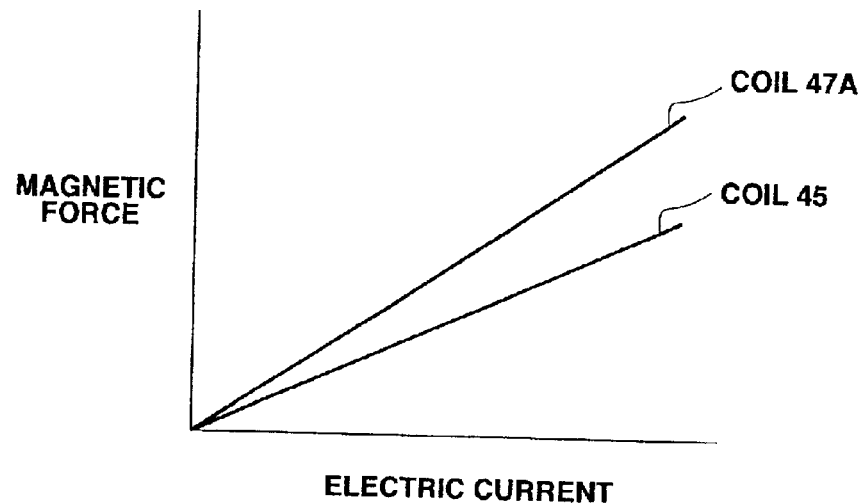
FIG. 17 is an electric-magnetic characteristic diagram of the electromagnetic unit shown in FIG. 16A.

Referring now to FIG. 16A, FIG. 16B, and FIG. 17, the electromagnetic unit according to the third embodiment of the invention will be described.

FIG. 16A is a vertical cross section taken along the plane including the axes of the plunger and of the fixed iron core of the electromagnetic unit which is an electromagnetic drive according to the third embodiment, and FIG. 16B is a drawing viewed in the direction of the arrow Q in FIG. 16A. FIG. 17 is an electric-magnetic characteristic diagram of the electromagnetic unit shown in FIG. 16A.

The electromagnetic unit 42A of this embodiment is to be applied instead of the electromagnetic unit 42 for driving the light exposure controlling unit for controlling the amount of light of a luminous flux in the lens barrel 61 of the second embodiment shown in FIG. 10.

The electromagnetic unit 42A differs from the electromagnetic unit 42 in the winding form of the coil on the side of the fixed iron core 51 out of two coils constituting the solenoid in the electromagnetic unit 42. Other structures are the same and thus designated by the same reference numerals for description.

The electromagnetic unit 42A is a electromagnet of direct current solenoid plunger type, and comprises, as shown in FIG. 16A, two plate-shaped yokes comprising a yoke (first yoke member) 43 and a yoke on the side of the projecting end of the plunger (first yoke member) 44 formed of magnetic material, a fixed iron core 50 for a plunger stopper formed of magnetic material to be fixed on the side of the yoke 43, and a fixed iron core (second yoke member) 51 formed of magnetic material to be fixed between the yokes 43, 44, a bobbin 46 held between the yokes 43, 44 and having a hollow space 46a, a coil 45 as a first solenoid formed by winding a first winding wire on the bobbin 46, a coil 47A as a second solenoid formed by directly winding a second winding wire on the fixed iron core 51 without using a bobbin, a plunger 49 being a movable iron core formed of magnetic material, and a conical spring 52 for urging the plunger 49 in the direction of projection.

The yokes 43, 44, each being a plate member having a width of H3, are held and fixed in parallel at a prescribed distance with each other as shown in FIG. 16B with the coil 47A wound on the fixed iron core 51 and the coil 45 wound around the bobbin 46 having a hollow space 46a interposed therebetween. In this state, the coils 45, 47A are held in a state in which the winding axes of the coils lie in parallel with each other and orthogonal to the plane of the yokes 43, 44. The end of the yoke 44 opposite from the fixed iron core 51 is bent in the direction orthogonal to the plane of the yoke 44, and the bent portion 44b is provided with a mounting screw hole 44a and positioning recesses 44b, 44c.

The plunger 49 is movable in the hollow space 46a of the bobbin 46 between the sucked position and the projected position along the direction orthogonal to the plane of the yoke 44 and parallel with the axis of the fixed iron core 51.

The coil 47A is wound in the opposite direction with respect to the coil 45, and connected in series with the coil 45. Since the outer diameter of the fixed iron core 51 is smaller than that of the bobbin 46, and the coil 47A is wound on the fixed iron core 51 without using the bobbin, the inner diameter of the coil 47A is smaller than the inner diameter of the coil 45 wound on the bobbin 46. Therefore, assuming that the outer diameters of the coil 45 and the coil 47A are the same, the number of turns of the coil 47A is larger than the number of turns of the coil 45, (larger in ampere turn), and thus a magnetic force generated in the coil 47 is larger than that in the coil 45. FIG. 17 shows the electric-magnetic characteristic diagram showing magnetic forces generated at the coil 45 and the coil 47A. As a result, a magnetic force generated by the electromagnetic unit 42A of this embodiment is larger than the case where the number of turns of the coil 47A is the same as that of the coil 45.

When mounting the electromagnetic unit 42A on the shutter body 3, the bent potion 44b of the yoke 44 is abutted against the surface of the shutter body 3 on the side of the taking lens, which is orthogonal to the optical axis O, and the positioning projections 3f, 3g are fitted into the positioning recesses 44b, 44c. Then the screw 53 is inserted through the screw insertion hole 3h, screwed into the threaded hole 44a to fix the yoke 44 thereon. In this state, the plunger 49, the coil 45, and the coil 47A are disposed in such a manner that the respective axes lie along the circumference of the optical axis O, in other words, along the direction orthogonal to the optical axis O as in the states shown in FIGS. 11 and 12 showing the second embodiment. In such an arrangement, the electromagnetic unit 42A is disposed between the outer periphery of the taking lens 2 and the inner periphery of the lens frame 1.

When driving the electromagnetic unit 42A, as in the case of the electromagnetic unit 42, an exciting voltage of the DC power source 34 is applied to the coils 45, 47A via the solenoid driving circuit 33 based on the controlling signals for driving the solenoid supplied from the CPU 32 for controlling the camera to pass an exciting current. The exciting current supplied to the coils 45, 47A generates a magnetic flux on these coils, and thus a looped magnetic circuit is formed along the yoke 44, the plunger 49, the fixed iron core 50, the yoke 43, and the fixed iron core 51. The on and off operation of this magnetic circuit controls the suction and projection of the plunger 49.

The shutter lever of the lens barrel driven by the electromagnetic unit 42A is also urged by the shutter spring 8 to rotate as in the case of the shutter lever 41 in the second embodiment, and the plunger abutment portion 41b of the shutter lever 41 abuts against the top surface 49c of the plunger 49 from the direction of the axis of the plunger. The projection and suction of the plunger 49 make the shutter lever 7 rotate to control the opening and closing of the shutter blades 4, 5.

The light exposure controlling operation of the lens barrel by the electromagnetic unit 42A according to this embodiment constructed as described above is the same as the light exposure controlling operation in the lens barrel 61 according to the second embodiment.

In the electromagnetic unit 42A according to the third embodiment of the invention described thus far, since the solenoid is formed of two coils 45, 47A connected in series, the outer diameter of the coil is smaller than that of the single coil of the conventional electromagnetic unit 100 shown in FIG. 20. Especially in this embodiment, the inner diameter of the coil 47A is smaller than that of the coil 45, and thus the number of turns may be increased correspondingly, which contributes to downsizing of the electromagnetic unit 42A.

Figure 19:
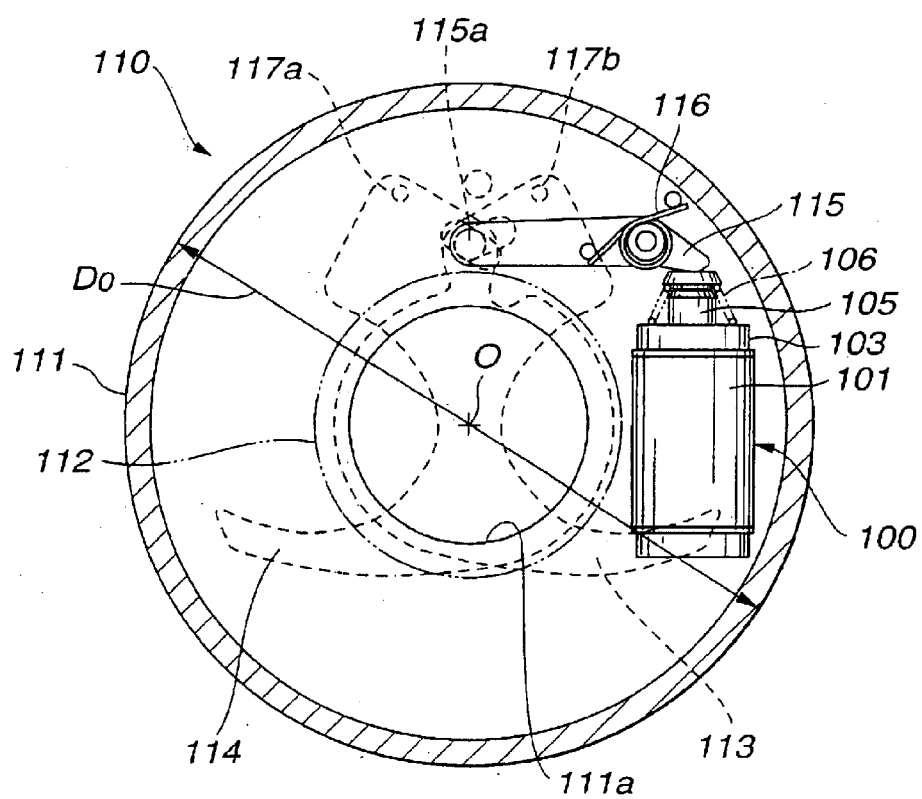
FIG. 19 is a vertical cross section of the lens barrel provided with a conventional light exposure controlling unit.

Therefore, the electromagnetic unit 42A may be accommodated in a smaller space between the outer periphery of the taking lens and the inner periphery of the lens frame, which enables the outer diameter of the lens frame to be reduced. For example, the outer diameter of the lens frame of the lens barrel is smaller than the outer diameter D1 of the lens frame of the lens barrel 110 to which the conventional electromagnetic unit shown in FIG. 19 is applied, and thus downsizing of the lens barrel is realized.

It is possible to employ a winding wire having a different diameter from the coil 45 for the coil in the electromagnetic unit 42A to obtain an appropriate electric-magnetic characteristic.

It is also possible to apply coils in the form of the two coils 45, 47A applied to the electromagnetic unit 42A in the third embodiment instead of the two coils 14, 16 in the electromagnetic unit 11 (FIG. 6) in the first embodiment. In this case, the plunger 17 provided with the band of projections 17b, 17d is employed to the electromagnetic unit having the coils 45, 47A. When the electromagnetic unit is mounted on the lens barrel in such a manner described above, the direction of the axis of the plunger 17 and of the winding axes of the coils 45, 47A are maintained in parallel with the optical axis O.

Now, a lens barrel 10B having an electromagnetic unit for controlling light exposure in the electromagnetic drive according to the fourth embodiment of the invention will be described.

Figure 18:
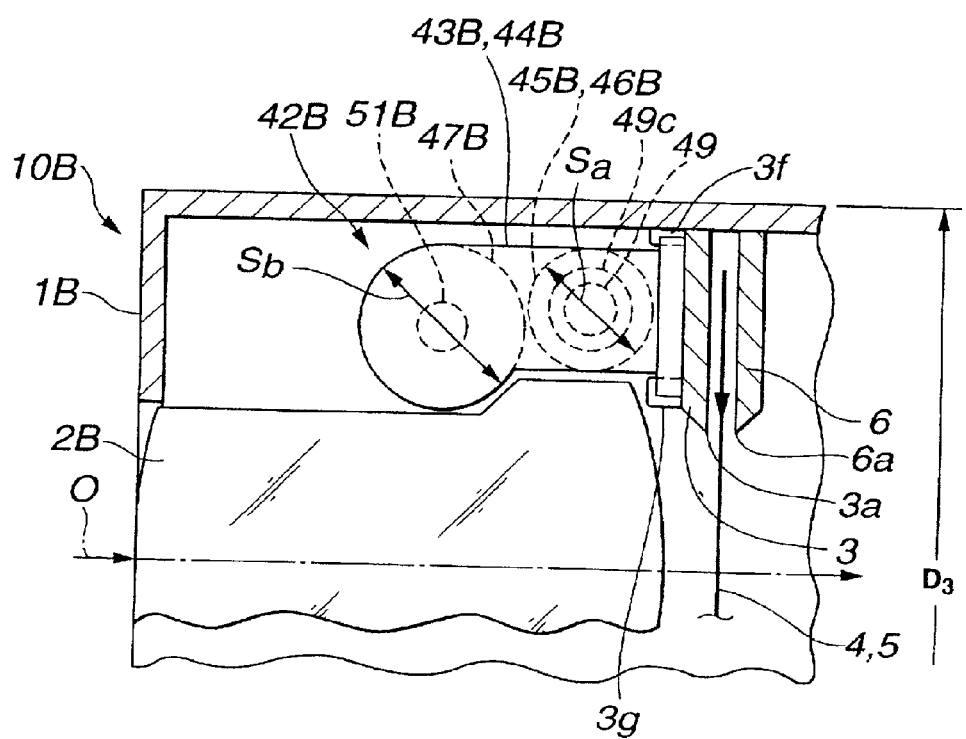
FIG. 18 is a vertical cross section of the lens barrel including the electromagnetic unit according to the fourth embodiment of the invention integrated therein, taken along the optical axis.

FIG. 18 is a vertical cross section of the upper half of the lens barrel 10B around the electromagnetic unit taken along the optical axis O.

The lens barrel 10B of this embodiment differs from the lens barrel 61 according to the second embodiment (FIG. 10) in the construction of the electromagnetic unit applied, and the mounting state of the electromagnetic unit into the lens barrel. Other constructions are the same as the lens barrel 61 of the second embodiment. Therefore, the following description is limited to the different constructions. The same components are designated by the same reference numerals as the lens barrel 61 in the description.

The electromagnetic unit 42B to be integrated in the lens barrel 10B is an electromagnet of direct current solenoid plunger type, and comprises, as shown in a cross sectional view of FIG. 18, two plate-shaped yokes (first yoke member) 43B and the yoke on the side of the projecting end of the plunger (first yoke member) 44B formed of magnetic material, a fixed iron core (not shown) formed of magnetic material for a plunger stopper to be fixed on the yoke 43B side, a fixed iron core (second yoke member) 51B formed of magnetic material to be fixed between the yokes 43B, 44B, a bobbin 46B held between the yoke 43B, 44B and having a hollow space, a coil 45B as a first solenoid formed by winding a first winding wire on the bobbin, and a coil 47B as a second solenoid formed by winding a second winding wire directly on the fixed iron core 51 without using a bobbin, and further comprises a plunger 49 (FIG. 13) which is a movable iron core formed of the same magnetic material as the one applied to the electromagnetic unit 42, and a conical spring 52 (FIG. 13) for urging the plunger 49 in the direction of projection.

The yokes 43B, 44B differ from the yokes 43, 44 (FIG. 13, 14) applied to the electromagnetic unit 42 shown in FIG. 12 only in that they have configurations corresponding to the outer diameters of the coils 45B, 47B as shown in FIG. 18.

The coil 45B is wound on the bobbin 46B, and the outer diameter Sa of the coil is smaller than the outer diameter of the coil 45 (FIG. 13) of the electromagnetic unit 42, whereby the number of turns of the coil 45B is smaller than that of the coil 45.

On the other hand, the coil 47B is wound in the opposite direction from the coil 45B and connected in series thereto, and the coil 47B is wound on the outer periphery of the fixed iron core 51B without a bobbin. The inner diameter of the coil 47B is smaller than the inner diameter of the coil 45, and the outer diameter Sb of the coil 47B is larger than the outer diameter Sa of the coil 45B. The outer diameter Sb is determined also to be larger than the outer diameter of the coil 47 (FIG. 13) of the electromagnetic unit 42. Therefore, the number of turns of the coil 47B may be significantly increased.

Therefore, a magnetic force obtained by the coils 45B, 47B of the electromagnetic unit 42B is the same as a magnetic force obtained by the coils 45, 47 of the electromagnetic unit 42, so that the same driving force for opening and closing the shutter blades may be obtained.

On the other hand, attachment of the electromagnetic unit 42B to the shutter body 3 may be performed in the same manner as in the case of the electromagnetic unit 42. In this state, the plunger 49, the coil 45B, the coil 47B are arranged in a state in which the direction of the axis and their winding axes lie along the circumference of the optical axis O.

In this arrangement, the electromagnetic unit 425 is accommodated between the outer periphery of the taking lens 2B and the inner periphery of the lens frame 1B as shown in a cross sectional view in FIG. 18, and the outline of the taking lens 2B is shouldered In order to decrease the outer diameter D3 of the lens frame 1B. In other words, the electromagnetic unit 42B can be positioned closer to the optical axis O of the taking lens 2B to the extent corresponding to the decreased diameter of the coil 45B. Concurrently, the outer diameter of the taking lens 25 at the position where the coil 47B is located is decreased to the extent corresponding to the increased diameter of the coil 47B. As a result, the outer diameter D3 of the lens frame 1B can be decreased to the extent corresponding to the distance that the electromagnetic unit 42B is moved toward the optical axis O in comparison with the outer diameter D2 of the lens frame 1 shown in FIG. 11.

As is described thus far, according to the lens barrel 10B to which the electromagnetic unit 42B of this embodiment is applied, the storage efficiency of the electromagnetic unit 42B in the lens frame can be increased by increasing and decreasing the coil diameters of two coils in the electromagnetic unit 42B, whereby the outer diameter D3 of the lens frame 1B that determines the outer dimension of the lens barrel 10B can be decreased.

The coils and the yokes in the form of two coils 45B, 47B and yokes 43B, 44B applied to the electromagnetic unit 42B in the fourth embodiment may be used instead of two coils 14, 16 and yokes 12, 13 of the electromagnetic unit 11 (FIG. 6) in the first embodiment. In this case, the plunger 17 having the bands of projection 17b, 17d is employed in the electromagnetic unit in which the coil 45B, 47B, and yokes 43B, 44B are applied. When the electromagnetic unit is mounted to the lens barrel in such a manner described above, the direction of the axis of the plunger 17 and the directions of the winding axes of the coils 45B, 47B may be maintained in parallel with the optical axis O.

The unit for controlling the amount of light as described in conjunction with each embodiment may be applied not only to the light exposure controlling unit, but also to an aperture controlling unit, or to a light amount controlling unit for the optical equipment other than the camera, as a matter of course. Each of the electromagnetic units described above may also be applied as an actuator for other controlling unit, as a matter of course.

What is claimed is:

1. An electromagnetic drive for controlling an amount of light of a luminous flux, said electromagnetic drive comprising:

a solenoid having a coil whose winding axis is disposed in parallel with a direction of the luminous flux;

a movable plunger that is movable in parallel with the direction of the luminous flux by a magnetic force of the solenoid; and a blade member driven by the movable plunger for controlling the amount of light of the luminous flux.

2. An electromagnetic drive for controlling the amount of light of a luminous flux according to claim 1, wherein a plurality of solenoids are provided, and the plurality of solenoids are magnetically connected via a yoke member.

3. An electromagnetic drive for controlling the amount of light of a luminous flux according to claim 1, wherein the movable plunger includes a band of projection provided around the movable plunger in a vicinity of an end portion of the movable plunger, and wherein the movable plunger is moved in the solenoid using the band of projection.

4. An electromagnetic drive for controlling the amount of light of a luminous flux according to claim 1, further comprising:
a bearing portion for supporting the movable plunger at an end portion thereof exposed out of the solenoid.

5. An electromagnetic drive for controlling the amount of light of a luminous flux according to claim 2, wherein the plurality of solenoids have different central inner diameters from each other.

6. An electromagnetic drive for controlling the amount of light of a luminous flux according to claim 2, wherein the plurality of solenoids have different outer diameters from each other.

7. An electromagnetic drive for controlling the amount of light of a luminous flux according to claim 6, further comprising a bearing portion which supports the movable plunger at an end portion thereof exposed out of the solenoid, and a band of projection formed on a peripheral surface in a vicinity of the end portion of the movable plunger to be fitted into the bearing portion, wherein the movable plunger is slidably movable in the bearing portion using the projection.

8. An electromagnetic drive for controlling an amount of light of a luminous flux, said electromagnetic drive comprising:
a solenoid having a coil whose winding axis is disposed in parallel with a direction of the luminous flux;
a movable plunger that is movable in a direction parallel to the direction of the luminous flux by a magnetic force of the solenoid;
a switching member for switching a direction in which a locomotive faculty of the movable plunger acts from the direction parallel to the direction of the luminous flux to a direction perpendicular to the direction of the luminous flux; and
a blade member driven by the locomotive faculty obtained by the switching member.

9. An electromagnetic drive for controlling the amount of light of a luminous flux according to claim 8, wherein the switching member pivots about the winding axis in parallel with the direction of the luminous flux.

10. An electromagnetic drive for controlling the amount of light of a luminous flux according to claim 8, wherein a plurality of solenoids are provided, and the plurality of solenoids are magnetically connected by a yoke member.

11. An electromagnetic drive for controlling the amount of light of a luminous flux according to claim 8, wherein the plurality of solenoids have different central inner diameters from each other.

12. An electromagnetic drive for controlling the amount of light of a luminous flux according to claim 8, wherein the plurality of solenoids have different outer diameters from each other.

13. An electromagnetic drive for controlling the amount of light of a luminous flux according to claim 8, wherein the movable plunger includes a band of projection provided around the movable plunger in a vicinity of an end portion of the movable plunger, and wherein the movable plunger is movable in the solenoid using the band of projection.

14. An electromagnetic drive for controlling the amount of light of a luminous flux according to claim 10, further comprising:
a bearing portion for supporting the movable plunger at an end portion thereof exposed out of the solenoid.

15. An electromagnetic drive for controlling the amount of light of a luminous flux according to claim 14, wherein the movable plunger includes a band of projection formed on a peripheral surface in a vicinity of the end portion of the movable plunger to be fitted into the bearing portion, and wherein the movable plunger is movable in the bearing portion using the band of projection.

16. An electromagnetic drive for controlling an amount of light of a luminous flux, said electromagnetic drive comprising:
a plurality of solenoids having coils whose winding axes lie perpendicular to a direction of the luminous flux;
a movable plunger that is movable along one of the winding axes by a magnetic force of the solenoid; and
a blade member driven by the movable plunger for controlling the amount of light of the luminous flux.

17. An electromagnetic drive for controlling the amount of light of a luminous flux according to claim 16, wherein the plurality of solenoids have different central inner diameters from each other.

18. An electromagnetic drive for controlling the amount of light of a luminous flux according to claim 16, wherein the plurality of solenoids have different outer diameters from each other.

19. An electromagnetic drive for controlling the amount of light of a luminous flux according to claim 16, wherein the plurality of solenoids are disposed along the direction of the luminous flux in such a manner that the winding axes of the coils are respectively lying on planes perpendicular to the direction of the luminous flux, in parallel with each other.

20. An electromagnetic drive for controlling the amount of light of a luminous flux according to claim 16, wherein the movable plunger includes a band of projection provided around the movable plunger in a vicinity of an end portion of the movable plunger, and wherein the movable plunger is movable in the solenoid using the band of projection.

21. An electromagnetic drive for controlling the amount of light of a luminous flux according to claim 19, further comprising:
a bearing portion for supporting the movable plunger at an end portion thereof exposed out of the solenoid.

22. An electromagnetic drive for controlling the amount of light of a luminous flux according to claim 21, wherein the movable plunger includes a band of projection formed on a peripheral surface in a vicinity of the end portion of the movable plunger to be fitted into the bearing portion, and wherein the movable plunger is movable in the bearing portion using the band of projection.

23. An electromagnetic drive for controlling an amount of light of a luminous flux comprising:
a plurality of solenoids having respective center axes corresponding to respective different lines;
a movable plunger that is movable along one of the center axes of the plurality of solenoids by a magnetic force of the plurality of solenoids; and
a yoke member for forming magnetic fluxes generated from the plurality of solenoids into a loop.

24. An electromagnetic drive for controlling the amount of light of a luminous flux according to claim 23, wherein the plurality of solenoids have different central inner diameters from each other.

25. An electromagnetic drive for controlling the amount of light of a luminous flux according to claim 23, wherein the plurality of solenoids have different outer diameters from each other.

26. An electromagnetic drive for controlling the amount of light of a luminous flux according to claim 23, wherein the plurality of solenoids are disposed in parallel with each other.

27. An electromagnetic drive for controlling the amount of light of a luminous flux according to claim 23, wherein the movable plunger includes a projection provided around the movable plunger in a vicinity of an end portion of the movable plunger, and wherein the movable plunger is moved in the solenoid using the projection.

28. An electromagnetic drive for controlling the amount of light of a luminous flux according to claim 26, further comprising:

a bearing portion for supporting the movable plunger at an end portion thereof exposed out of the solenoid.

29. An electromagnetic drive for controlling the amount of light of a luminous flux according to claim 28, wherein the movable plunger includes a band of projection formed on a peripheral surface in a vicinity of the end portion of the movable plunger to be fitted into the bearing portion, and wherein the movable plunger is movable in the bearing portion using the band of projection.

* * * * *